(12) United States Patent
Li et al.

(10) Patent No.: US 12,353,182 B2
(45) Date of Patent: Jul. 8, 2025

(54) ENERGY-SAVING PREDICTION METHOD FOR FACTORY ELECTRICITY CONSUMPTION AND ELECTRONIC APPARATUS

(71) Applicant: Wistron Corporation, New Taipei (TW)

(72) Inventors: Chun-Hsien Li, New Taipei (TW); Chia-Chiung Liu, New Taipei (TW); Che-Wen Ku, New Taipei (TW); Chun I Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 378 days.

(21) Appl. No.: 17/901,810

(22) Filed: Sep. 1, 2022

(65) Prior Publication Data

US 2024/0019827 A1  Jan. 18, 2024

(30) Foreign Application Priority Data

Jul. 13, 2022  (TW) .................................. 111126231

(51) Int. Cl.
 *G05B 19/042* (2006.01)
(52) U.S. Cl.
 CPC .. *G05B 19/042* (2013.01); *G05B 2219/25289* (2013.01)
(58) Field of Classification Search
 CPC ........ G05B 19/042; G05B 2219/25289; G03F 7/70125; H01L 21/0274; H01L 21/31144;
 (Continued)

(56) References Cited

U.S. PATENT DOCUMENTS

| 2011/0172792 | A1 | 7/2011 | Shinohara et al. |
| 2014/0018967 | A1* | 1/2014 | Sako ..................... G05B 13/02 |
| | | | 700/291 |

(Continued)

FOREIGN PATENT DOCUMENTS

| CN | 102063078 | 5/2011 |
| CN | 104391489 | 3/2015 |

(Continued)

OTHER PUBLICATIONS

"Office Action of Taiwan Counterpart Application", issued on May 29, 2023, p. 1-p. 11.

*Primary Examiner* — Chun Cao
(74) *Attorney, Agent, or Firm* — JCIPRNET

(57) ABSTRACT

An energy-saving prediction method for factory electricity consumption and an electronic apparatus are provided. The method includes the following steps. A reference electricity consumption amount in a unit period is predicted based on factory actual operation information in the unit period by using an electricity consumption prediction model. An actual electricity consumption amount in the unit period is acquired. The reference electricity consumption amount and the actual electricity consumption amount are displayed on an electricity consumption reference interface. A function is provided according to a first difference value between the reference electricity consumption amount and the actual electricity consumption amount.

18 Claims, 8 Drawing Sheets

(58) Field of Classification Search
CPC ....... H01L 23/562; H10B 41/10; H10B 41/27; H10B 41/50; H10B 43/10; H10B 43/27; H10B 43/50
USPC ......................................................... 700/291
See application file for complete search history.

(56) References Cited

U.S. PATENT DOCUMENTS

| | | | |
|---|---|---|---|
| 2015/0051745 A1* | 2/2015 | Imanari | H02J 3/32 700/291 |
| 2019/0122132 A1* | 4/2019 | Rimini | G06Q 50/06 |
| 2021/0215370 A1 | 7/2021 | Moon et al. | |

FOREIGN PATENT DOCUMENTS

| | | | |
|---|---|---|---|
| CN | 105205566 | | 12/2015 |
| CN | 109727155 | | 5/2019 |
| CN | 109727155 A | * | 5/2019 |
| CN | 109426205 | | 3/2021 |

* cited by examiner

Electricity Consumption Analysis

| Electricity Consumption Reference Line | Electricity Consumption Prediction | Energy-Saving Technical Transformation |

Year of inquiry: [2021 ▼]   Plant: [WCD ▼]   [Search]   [Excel]

| Month | Basic Electricity Consumption (kWh) | | | Air-Conditioning Electricity Consumption (kWh) | | | Air-Compression Electricity Consumption (kWh) | | | Production Electricity Consumption (kWh) | | |
|---|---|---|---|---|---|---|---|---|---|---|---|---|
| | Actual Electricity Consumption | Reference Line | Difference | Actual Electricity Consumption | Reference Line | Difference | Actual Electricity Consumption | Reference Line | Difference | Actual Electricity Consumption | Reference Line | Difference |
| JAN | 13,209,805 | 15,507,280 | -2,297,475 | 169,416 | 199,831 | -30,415 | 937,715 | 739,036 | +198,679 | 1,072,516 | 1,705,361 | -632,845 |
| FEB | 13,209,805 | 15,507,280 | -2,297,475 | 169,416 | 199,831 | -30,415 | 937,715 | 739,036 | +198,679 | 1,072,516 | 1,705,361 | -632,845 |
| MAR | 13,209,805 | 15,507,280 | -2,297,475 | 169,416 | 199,831 | -30,415 | 937,715 | 739,036 | +198,679 | 1,072,516 | 1,705,361 | -632,845 |
| APR | 13,209,805 | 15,507,280 | -2,297,475 | 169,416 | 199,831 | -30,415 | 937,715 | 739,036 | +198,679 | 1,072,516 | 1,705,361 | -632,845 |
| MAY | 13,209,805 | 15,507,280 | -2,297,475 | 169,416 | 199,831 | -30,415 | 937,715 | 739,036 | +198,679 | 1,072,516 | 1,705,361 | -632,845 |
| JUN | 13,209,805 | 15,507,280 | -2,297,475 | 169,416 | 199,831 | -30,415 | 937,715 | 739,036 | +198,679 | 1,072,516 | 1,705,361 | -632,845 |

Basic Data: March
Click on the left column to view data for the month

| | |
|---|---|
| PCBA output (pcs) | 3,065,547 |
| FA output (pcs) | 133,930 |
| Number of people (person) | 1,123 |
| Number of established PCBA lines | 2,177 |
| Number of established FA lines | 2,414 |
| Turnover (billion NTD) | 0 |
| Average outside air temperature (°C) | 5 |

Basic Electricity Consumption Prediction Model (Thousands in kWh) — 311

2021.03
Basic electricity consumption 13,209,805
Actual electricity consumption 15,507,280
Reference Line
Difference -2,297,475
Estimated electricity-saving effects of energy-saving technological transformation 2,000,000

Air-Conditioning Electricity Consumption Prediction Model (Thousands in kWh) — 312

Air-compression Electricity Consumption Prediction Model (Thousands in kWh) — 313

2021.04
Actual electricity consumption 937,715
Reference Line 739,036
Estimated electricity-saving effects of energy-saving technological transformation 1,000,000
Difference +198,679

Production Electricity Consumption Prediction Model (Thousands in kWh) — 314

FIG. 7A

Energy-Saving Technical Transformation Items & Expected Electricity-Saving Effect Planning Table — 71

[Electricity Consumption Reference Line] [Electricity Consumption Prediction] [Energy-Saving Technical Transformation]

Year of inquiry: [2021 ▼]  Plant: [WCD ▼]  [Search]

[+ Add technical transformation item]

Expected Effects

| Electricity Consumption Type | Improvement Measurements | JAN | FEB | MAR | APR | MAY | JUN | JUL | AUG | SEP | OCT | NOV | DEC | Total | PIC | Calculation Logic | Remark | Edit |
|---|---|---|---|---|---|---|---|---|---|---|---|---|---|---|---|---|---|---|
| Air-Conditioning Electricity Consumption | Smart control of air-conditioning box | 1,065 | 0 | 3,861 | 2,471 | 0 | 0 | 1,798 | 2,816 | 2,592 | 3,402 | 0 | 2,366 | 20,371 | Tom | Total electricity consumption of air-conditioning boxes reached 1.275 million kWh in 2020. Through the supplied/returned fresh air temperature, | Improvement items for excessive electricity consumption | ✎ |
| Basic Electricity Consumption — 711 | Smart lighting control system | 0 | 1,928 | 2,017 | 3,917 | 2,463 | 0 | 926 | 1,261 | 3,160 | 2,715 | 1,182 | 0 | 19,569 | Dick | Annual lighting electricity consumption is 605,000 kWh, which is controlled according to time and illuminance, and the reduction of personnel has not been implemented | -- | ✎ |
| Air-Compression Electricity Consumption — 712 | Air compressor in standby idling state | 0 | 1,928 | 2,017 | 3,917 | 2,463 | 0 | 926 | 1,261 | 3,160 | 2,715 | 1,182 | 0 | 19,569 | Harry | -- | Improvement items for excessive electricity consumption | ✎ |

Total Planned Electricity Saving (thousands in kWh)

| Electricity Consumption Type | JAN | FEB | MAR | APR | MAY | JUN | JUL | AUG | SEP | OCT | NOV | DEC | Total |
|---|---|---|---|---|---|---|---|---|---|---|---|---|---|
| Basic Electricity Consumption | 1,337 | 0 | 2,514 | 916 | 0 | 7,561 | 3,165 | 1,434 | 1,027 | 2,027 | 0 | 725 | 20,706 |
| Air-Conditioning Electricity Consumption | 0 | 0 | 0 | 1,073 | 729 | 2,615 | 0 | 0 | 1,127 | 819 | 3,271 | 2,367 | 12,001 |

FIG. 7B

ENERGY-SAVING PREDICTION METHOD FOR FACTORY ELECTRICITY CONSUMPTION AND ELECTRONIC APPARATUS

CROSS-REFERENCE TO RELATED APPLICATION

This application claims the priority benefit of Taiwan application serial no. 111126231, filed on Jul. 13, 2022. The entirety of the above-mentioned patent application is hereby incorporated by reference herein and made a part of this specification.

BACKGROUND

Technical Field

The disclosure relates to a method for analyzing electricity consumption, and in particular, relates to an energy-saving prediction method for factory electricity consumption and an electronic apparatus.

Description of Related Art

At present, as the importance of environmental protection issues such as greenhouse gas reduction and energy saving and carbon reduction has attracted increasing attention, energy saving becomes one of the key development projects of the factories. If the reasons for electricity wasting may be effectively found and suitable energy-saving methods may be provided, contribution to environmental protection is made, and the costs and profits of factories may be decreased and increased.

Regarding factory electricity consumption, it includes many different aspects of electricity consumption, such as: air-conditioning electricity consumption related to ambient temperature adjustment, air-compression electricity consumption and production electricity consumption related to the product production, and basic electricity consumption for maintaining general environmental use, etc., which all belong to the factory electricity consumption. Correspondingly, since the electricity consumption of a factory includes many different aspects, it is not easy to immediately determine the effectiveness or efficiency of energy-saving measures, and it is difficult to detect abnormal electricity consumption in time, which leads to unsatisfactory electricity consumption and rising energy costs.

SUMMARY

Accordingly, the disclosure provides an energy-saving prediction method for factory electricity consumption and an electronic apparatus aiming to solve the foregoing technical problems.

An embodiment of the disclosure provides an energy-saving prediction method for factory electricity consumption, and the method includes the following steps. A reference electricity consumption amount in a unit period is predicted based on factory actual operation information in the unit period by using an electricity consumption prediction model. An actual electricity consumption amount in the unit period is acquired. The reference electricity consumption amount and the actual electricity consumption amount are displayed on an electricity consumption reference interface. A function is provided according to a first difference value between the reference electricity consumption amount and the actual electricity consumption amount.

An embodiment of the disclosure further provides an electronic apparatus including a display, a storage circuit, and a processor. The storage circuit stores a plurality of instructions. The processor is coupled to the display and the storage circuit and accesses the instructions to be configured for performing the following steps. A reference electricity consumption amount in a unit period is predicted based on factory actual operation information in the unit period by using an electricity consumption prediction model. An actual electricity consumption amount in the unit period is acquired. The reference electricity consumption amount and the actual electricity consumption amount are displayed on an electricity consumption reference interface. A function is provided according to a first difference value between the reference electricity consumption amount and the actual electricity consumption amount.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7A is a schematic view of an electricity consumption reference interface according to an embodiment of the disclosure.

FIG. 7B is a schematic view of an electricity-saving management interface according to an embodiment of the disclosure.

DESCRIPTION OF THE EMBODIMENTS

Figure 1:
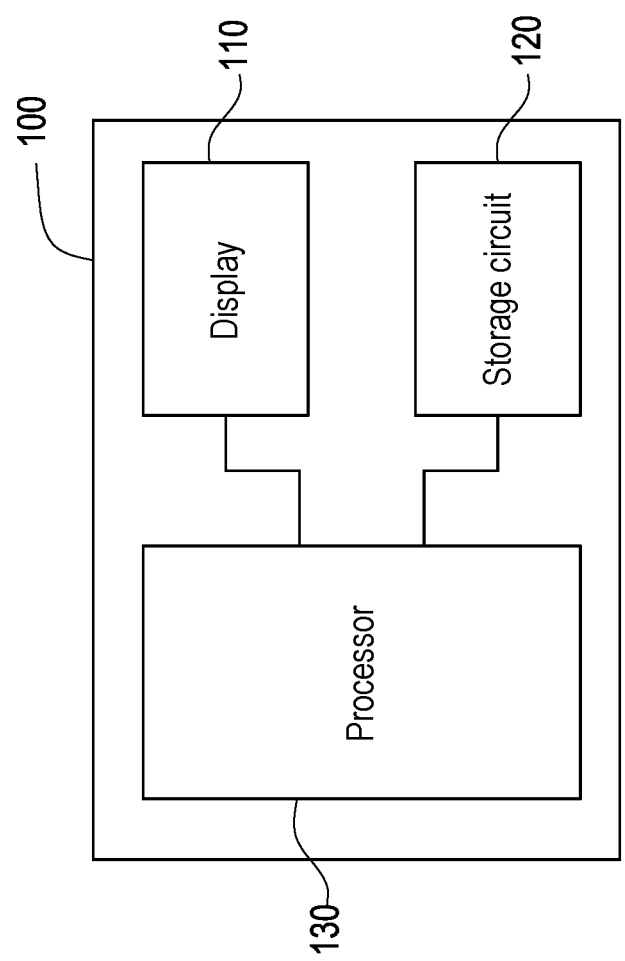
FIG. 1 is a schematic view of an electronic apparatus according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, the embodiments serve as examples of the apparatus and method fall within the scope of the claims of the disclosure.

With reference to FIG. 1, which is a schematic view illustrating an electronic apparatus according to an embodiment of the disclosure. In different embodiments, an electronic apparatus 100 is, for example, a computer apparatus with computing capabilities, such as a notebook computer, a desktop computer, a server, and a workstation, but it is not limited thereto. The electronic apparatus 100 may include a display 110, a storage circuit 120, and a processor 130.

The display 110 may be a liquid crystal display (LCD), a light emitting diode (LED) display, an organic light emitting diode (OLED) display, or other types of displays built in the electronic apparatus 100, but it is not limited thereto. In other embodiments, the display 110 may also be any display device externally connected to the electronic apparatus 100.

The storage circuit 120 is, for example, a fixed or a movable random access memory (RAM) in any form, a read-only memory (ROM), a flash memory, a hard disc, other similar devices, or a combination of the foregoing devices, and may be used to record a plurality of program codes or software modules.

The processor 130 may be, for example, a central processing unit (CPU), an application processor (AP), or a programmable microprocessor for general or special use, a digital signal processor (DSP), an image signal processor (ISP), a graphics processing unit (GPU), any other similar devices, an integrated circuit, or a combination of the foregoing. The processor 130 may access and execute the software modules recorded in the storage circuit 120, so as to implement an energy-saving prediction method for factory electricity consumption provided in the embodiments of the disclosure. The software modules may be construed broadly to mean instructions, instruction sets, codes, program codes, programs, applications, software packages, threads, procedures, functions, etc., whether referred to as software, firmware, intermediate software, microcode, hardware description language, or otherwise.

In the embodiments of the disclosure, the processor 130 may establish an electricity consumption prediction model according to historical operation information of a factory, and the trained electricity consumption prediction model may be recorded in the storage circuit 120. That is, the electricity consumption prediction model is a prediction model created by the processor 130 after performing machine learning or statistical calculation according to the training data set to predict a reference electricity consumption amount, and the reference electricity consumption amount is a predicted value based on a past electricity consumption pattern in a historical period. Besides, in some embodiments, the electricity consumption of the factory may be further classified into various electricity consumption types, and the processor 130 may establish a dedicated electricity consumption prediction model for each type of electricity consumption. The electricity consumption types are, for example, air-compression electricity consumption, air-conditioning electricity consumption, production electricity consumption, and basic electricity consumption, etc., but are not limited thereto.

Note that in some embodiments, the processor 130 establishes the electricity consumption prediction model according to the historical operation information which is collected when the factory has not implemented a specific electricity-saving item. That is, the reference electricity consumption amount outputted by the electricity consumption prediction model is a prediction result without considering the influence of the aforementioned electricity-saving item or a specific electricity-consuming item. Therefore, after the factory starts to execute the electricity-saving item, the processor 130 may determine the effect of the electricity-saving item according to the reference electricity consumption amount outputted by the electricity consumption prediction model and the actual electricity consumption amount of the factory. Further, the processor 130 may further determine whether there is an abnormal electricity-consuming item according to the reference electricity consumption amount outputted by the electricity consumption prediction model and the actual electricity consumption amount of the factory, so that a person in charge of the factory can immediately deal with it. That is, the reference electricity consumption amount predicted by the electricity consumption prediction model established based on the past electricity consumption pattern and historical operation information may be treated as a reference for electricity consumption evaluation. By comparing the reference electricity consumption amount predicted by the electricity consumption prediction model with the actual electricity consumption amount, the effect of the electricity-saving item may be determined, and the existence of the abnormal electricity-consuming item may be immediately detected.

Figure 2:
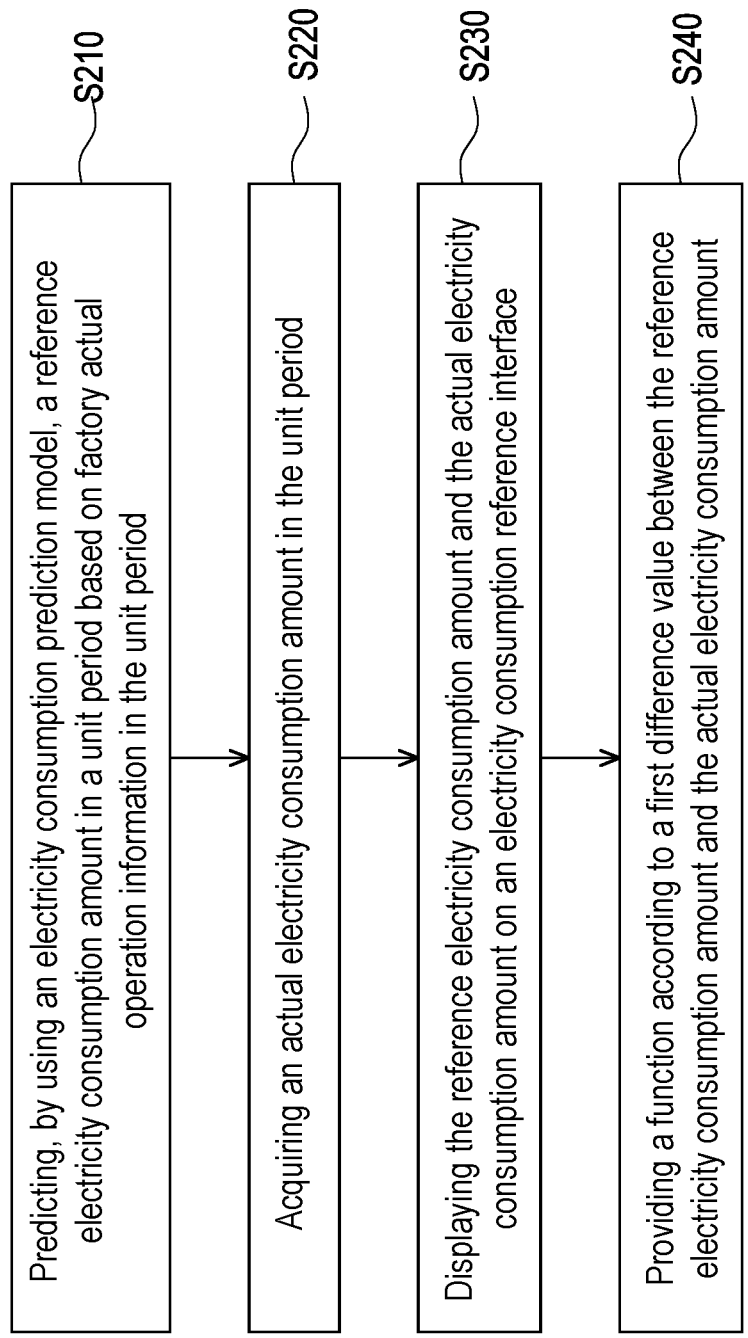
FIG. 2 is a flow chart of an energy-saving prediction method for factory electricity consumption according to an embodiment of the disclosure.

To be specific, FIG. 2 is a flow chart of an energy-saving prediction method for factory electricity consumption according to an embodiment of the disclosure. With reference to FIG. 1 and FIG. 2, the method provided by this embodiment is suitable for the electronic apparatus 100 provided by the foregoing embodiments, and steps of the energy-saving prediction method for factory electricity consumption provided by this embodiment together with the devices of electronic apparatus 100 are described in detail as follows.

In step S210, the processor 130 predicts a reference electricity consumption amount in a unit period based on factory actual operation information in the unit period by using an electricity consumption prediction model. The time length of the unit period may be one month, one week, one day, one hour, or one minute, etc., which is not limited in the disclosure. However, in order to clearly illustrate the disclosure, in the following embodiments, the time length of the unit period is one month as an example for description. The processor 130 may establish an electricity consumption prediction model according to historical operation information of a plurality of past unit periods before a specific time point and may predict at least one reference electricity consumption amount of a specific electricity consumption type according to the electricity consumption prediction model and the factory actual operation information for at least one unit period after the specific time point.

For instance, the processor 130 may establish the electricity consumption prediction model according to the historical operation information of the air-conditioning electricity consumption from January to September. After the end of October, the processor 130 may predict the reference electricity consumption amount of air-conditioning electricity consumption in October according to the factory actual operation information in October by using the electricity consumption prediction model. Further, the processor 130 may also predict the reference electricity consumption amount of the air-conditioning electricity consumption in November according to the factory actual operation information in November by using the electricity consumption prediction model. To be specific, the processor 130 may extract a plurality of important feature variables from the factory actual operation information in a specific month and may input these important feature variables into the electricity consumption prediction model, so as to drive the electricity consumption prediction model to output the reference electricity consumption amount of a specific electricity consumption type in the month. The important feature variables may include product output, number of product lines, number of people in the factory, turnover, average temperature, electricity consumption in the previous unit period, or interactive features based on any two of the foregoing.

In step S220, the processor 130 acquires an actual electricity consumption amount in the unit period. In some embodiments, after the unit period, the actual electricity consumption amount of the factory may be provided by a factory electricity meter to the processor 130, or the actual electricity consumption amount measured by the factory electricity meter may be inputted to the electronic apparatus 100 by the person in charge. For instance, after the end of October, the processor 130 may acquire the actual electricity consumption amount of each electricity consumption type from the factory electricity meter.

In step S230, the processor 130 displays the reference electricity consumption amount and the actual electricity consumption amount on an electricity consumption reference interface. In other words, the display 110 may display the electricity consumption reference interface, and the electricity consumption reference interface presents the reference electricity consumption amount and the actual electricity consumption amount for each of one or more electricity consumption types. In some embodiments, the processor 130 may display the reference electricity consumption amount and the actual electricity consumption amount on the electricity consumption reference interface through a graph. In some embodiments, the graph may include a line graph, and the line graph includes a predicted reference line and an actual electricity consumption line. The predicted reference line includes the reference electricity consumption amount corresponding to one unit period, and the actual electricity consumption line includes the actual electricity consumption amount corresponding to one unit period. In addition, in other embodiments, the graph may also be a histogram, a column graph, a bar graph, and so on. Alternatively, in other embodiments, the processor 130 can also use a table to present the reference electricity consumption amount and the actual electricity consumption amount in the electricity consumption reference interface. In some embodiments, the electricity consumption reference interface may present a plurality of reference electricity consumption amounts actual electricity consumption amounts corresponding to a plurality of past unit periods.

Figure 3:
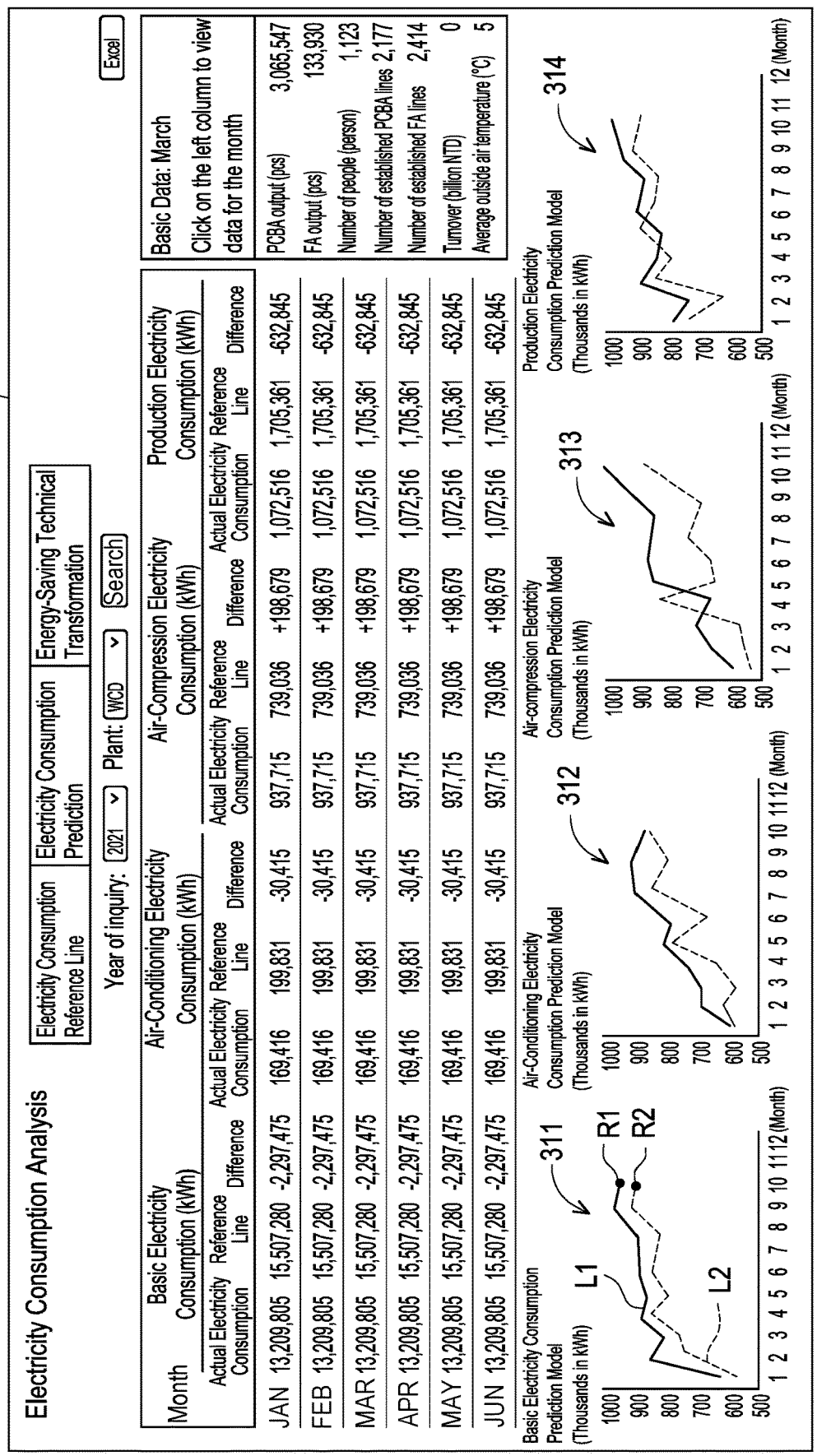
FIG. 3 is a schematic view of an electricity consumption reference interface according to an embodiment of the disclosure.

For instance, with reference to FIG. 3, FIG. 3 is a schematic view of an electricity consumption reference interface according to an embodiment of the disclosure. The processor 130 may display an electricity consumption reference interface 31 through the display 110, and the electricity consumption reference interface 31 may present the reference electricity consumption amount and the actual electricity consumption amount of each electricity consumption type corresponding to a plurality of unit periods. In the example of FIG. 3, the processor 130 may display the reference electricity consumption amounts and actual electricity consumption amounts of the air-compression electricity consumption, air-conditioning electricity consumption, production electricity consumption, and basic electricity consumption on the electricity consumption reference interface 31 through line graphs 311, 312, 313, and 314. The line graph 311 of the basic electricity consumption is treated as an example herein, line graph 311 includes a predicted reference line L1 and an actual electricity consumption line L2. The processor 130 may connect the reference electricity consumption amounts corresponding to the unit periods as the predicted reference line L1 according to the sequence of the plurality of unit periods. That is, the reference electricity consumption amount of each month is connected to form the predicted reference line L1. Similarly, the processor 130 may connect the actual electricity consumption amounts corresponding to the unit periods as the actual electricity consumption line L2 according to the sequence of the plurality of unit periods. That is, the actual electricity consumption amount of each month is connected to form the actual electricity consumption line L2. That is, the predicted reference line L1 includes plural reference electricity consumption amounts corresponding to different unit periods, such as a reference electricity consumption amount R1 corresponding to October. The actual electricity consumption line L2 includes plural actual electricity consumption amounts corresponding to different unit periods, such as an actual electricity consumption amount R2 corresponding to October.

In this way, the person in charge of the factory may quickly understand the difference between the reference electricity consumption amount of each unit period outputted by the electricity consumption prediction model and the actual electricity consumption amount of each unit period by viewing the electricity consumption reference interface 31 and then may roughly determine whether the electricity consumption of each unit period is in line with expectations or whether there is an abnormal situation. For instance, ideally, if the factory has implemented some electricity-saving items, the actual electricity consumption amount should reflect the implementation of these electricity-saving items and thus be less than the reference electricity consumption amount. Therefore, after the factory implements some electricity-saving items, if the actual electricity consumption amount is still greater than the reference electricity consumption amount, it means that abnormal electricity consumption occurs in the factory. The person in charge of the factory may evaluate the electricity consumption of this electricity consumption type and then addresses the problem of abnormality as soon as possible. It should be noted that some electricity-saving items implemented by the factory and some known abnormal electricity-consuming items may be recorded in the storage circuit 120, and the processor 130 may search the storage circuit 120 to obtain the electricity-saving items and abnormal electricity-consuming items for each unit period.

In step S240, the processor 130 provides a function according to a first difference value between the reference electricity consumption amount and the actual electricity consumption amount. In some embodiments, the processor 130 may determine the effect of the electricity-saving item according to the first difference value between the reference electricity consumption amount and the actual electricity consumption amount. Alternatively, the processor 130 may also determine whether there is an abnormal electricity-consuming item in the factory according to the first difference value between the reference electricity consumption amount and the actual electricity consumption amount. Based on the above, in some embodiments, the function may include controlling the interface display effect of the electricity consumption reference interface according to the first difference value to prompt the person in charge of the factory. In an embodiment, in response to the first difference value corresponding to a specific unit period satisfying a specific condition, the processor 130 may highlight the reference electricity consumption amount and the actual electricity consumption amount in the unit period in the electricity consumption reference interface. That is, according to whether the first difference value corresponding to a specific unit period satisfies a specific condition, the processor 130 may determine whether to highlight the reference electricity consumption amount and the actual electricity consumption amount in the unit period in the electricity consumption reference interface. If the first difference value corresponding to a specific unit period does not satisfy a specific condition, for example, not within a predetermined numerical value range, the processor 130 may determine to highlight the reference electricity consumption amount and the actual electricity consumption amount in the unit period in the electricity consumption reference interface. For instance, the processor 130 may, for example, highlight the reference electricity consumption amount and the actual electricity consumption amount in a specific month on the line graph 311 shown in FIG. 3. Alternatively, the function may include providing an electricity-saving management interface according to the first difference value. Still alternatively, the function may include searching for an electricity-saving item or an abnormal electricity-consuming item related to a unit period according to the first difference value corresponding to this unit period.

For instance, it is assumed that the first difference value of air-conditioning electricity consumption in October is 120,000 kWh. Since there is a festival in October and the factory air conditioner is shut down for 3 days, the processor 130 may estimate that the reduced electricity consumption amount of the air conditioner shut down for the three days is approximately 40,000 kWh according to the actual electricity consumption amount of the air-conditioning electricity consumption in October. In addition, due to the decrease in temperature in October, the electricity-saving item "outside air conditioning" is activated in some periods to reduce the time for using the air conditioner. The processor 130 may estimate that the electricity-saving amount of the electricity-saving item "outside air conditioning" is approximately 90,000 kWh according to the total activation hours of the outside air conditioning. The difference between the sum of the reduced electricity consumption amount due to festivals and the electricity-saving amount saved by the electricity-saving item (40,000 kWh+90,000 kWh=130,000 kWh) and the first difference value (i.e., 120,000 kWh) is 130,000 kWh−120,000 kWh=10,000 kWh, which is less than a predetermined threshold value, indicating that the difference therebetween is similar, and the processor 130 may then determine that no abnormality occurs in October.

Further, it is assumed that the processor 130 may observe that the actual electricity consumption amount in July is greater than the reference electricity consumption amount and the first difference value is approximately 50,000 kWh. Next, the processor 130 searches a trial production record of a new product to obtain actual trial production hours in July and calculates the electricity consumption during the actual trial production to be approximately 55,000 kWh. In this way, since the first difference value is approximately close to the electricity consumption of the trial production of the new product, the processor 130 can determine that the electricity-consuming items in July include the trial production of the new product, and no abnormality occurs.

It is worth mentioning that in some embodiments, the electricity consumption prediction model used to predict the reference electricity consumption amount may also be used to predict the electricity consumption amount in a future unit period, so as to further predict electricity consumption costs and measure the quantity of green energy to be purchased in the future.

Figure 4:
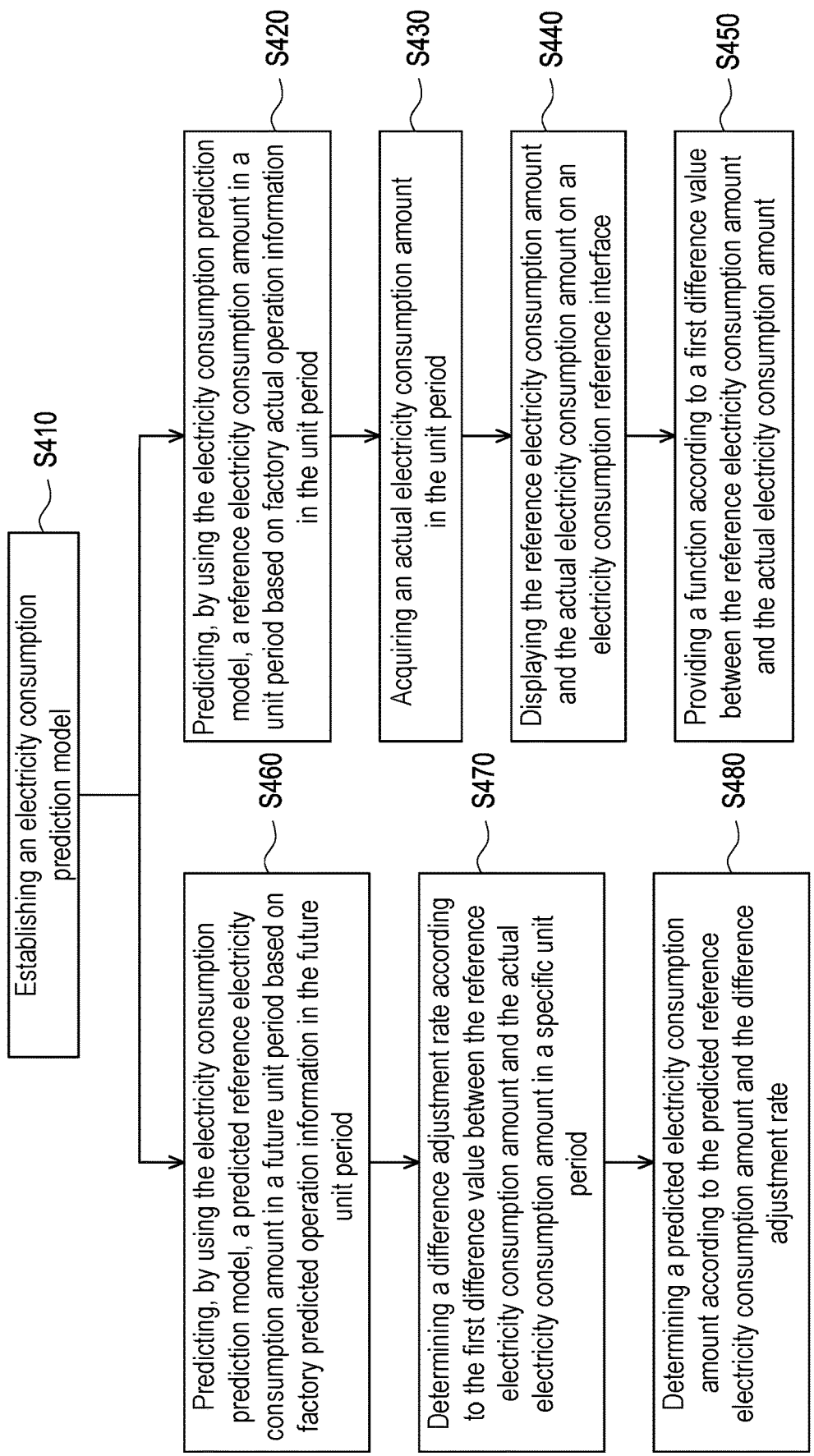
FIG. 4 is a flow chart of an energy-saving prediction method for factory electricity consumption according to an embodiment of the disclosure.

FIG. 4 is a flow chart of an energy-saving prediction method for factory electricity consumption according to an embodiment of the disclosure. With reference to FIG. 1 and FIG. 4, the method provided by this embodiment is suitable for the electronic apparatus 100 provided by the foregoing embodiments, and steps of the energy-saving prediction method for factory electricity consumption provided by this embodiment together with the devices of electronic apparatus 100 are described in detail as follows.

Figure 5:
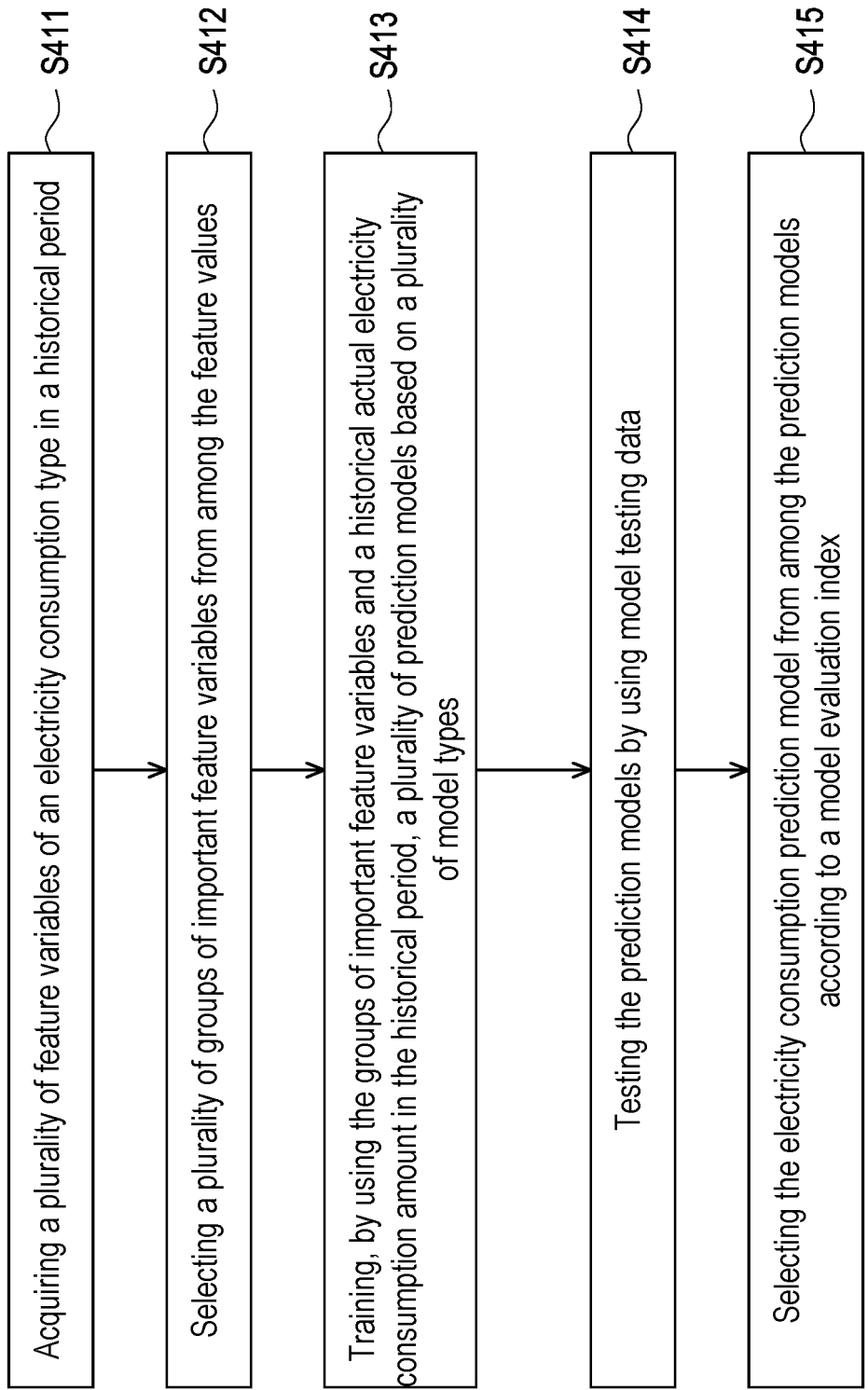
FIG. 5 is a flow chart of establishment of an electricity consumption prediction model according to an embodiment of the disclosure.

In step S410, the processor 130 establishes an electricity consumption prediction model. To be more specific, with reference to FIG. 5, which is a flow chart of establishment of an electricity consumption prediction model according to an embodiment of the disclosure. In the embodiment of FIG. 5, step S410 may be implemented as steps S411 to S416.

In step S411, the processor 130 acquires a plurality of feature variables of an electricity consumption type in a historical period. To be specific, after determining the electricity consumption prediction model to be established for the specific electricity consumption type, the processor 130 may collect historical operation information in a historical period (i.e., past multiple unit periods) for this electricity consumption type. The historical operation information may include a plurality of historical actual electricity consumption amounts and a plurality of feature variables that may affect electricity consumption during the historical period. In some embodiments, the processor 130 may acquire some feature variables from sensors or measuring instruments arranged inside and outside the factory and may also receive some feature variables inputted by the person in charge of the factory.

In some embodiments, the processor 130 may also generate a plurality of interactive feature variables according to any two of these feature variables. Each of the interactive feature variables can be the product of any two of these feature variables. For instance, the processor 130 may obtain 9 feature variables, which are "output of product A", "output of product B", "number of production lines of product A", "number of production lines of product B", "number of people in factory", "turnover", "outside air average temperature", "number and hours of air-conditioners turned on based on outside temperature indicative adjustment" and "electricity consumption of previous period". The processor 130 may obtain 36 interactive feature variables according to any two of the nine feature variables.

In step S412, the processor 130 selects a plurality of groups of important feature variables from among the feature values for one electricity consumption type. In some embodiments, the processor 130 may select the plurality of groups of important feature variables from among the feature variables and the interactive feature variables based on a plurality of feature selection algorithms in feature engineering, and the groups of important feature variables may include a plurality of important feature variables. To be specific, the processor 130 may select a group of important feature variables from among the feature variables and the interactive feature variables according to a first feature selection algorithm and may select another group of important feature variables from among the feature variables and the interactive feature variables according to a second feature selection algorithm. These feature selection algorithms may include the stepwise method or the shrinkage method provided by the conventional statistical methods. Alternatively, these feature selection algorithms may include the permutation importance method provided by the machine learning approach. Still alternatively, these feature selection algorithms may also include the feature selection method based on feature weights provided by the deep learning approach. For instance, Table 1 lists the three groups of important feature variables selected by the processor 130 for a specific electricity consumption type based on three feature selection algorithms. As shown in Table 1, the processor 130 may select a first group of important feature variables including 7 important feature variables according to the stepwise method. The processor 130 may select a second group of important feature variables including 6 important feature variables according to the shrinkage method. The processor 130 may select a third group of important feature variables including 4 important feature variables according to the permutation method.

ables and one of the model types. To be specific, in some embodiments, if the processor 130 can acquire the first group of important feature variables and the second group of important feature variables for a specific electricity consumption type, the processor 130 may train the first prediction model based on the first group of important feature variables, the first model type, and the historical actual electricity consumption amount in the historical period. The processor 130 may train the second prediction model based on the first group of important feature variables, the second model type, and the historical actual electricity consumption

TABLE 1

| Stepwise | Shrinkage | Permutation Importance |
| --- | --- | --- |
| 1. Interactive feature variables based on outside air average temperature and number of production lines of product B | 1. Interactive feature variables based on output of product A and electricity consumption of previous period | 1. Output of product A |
| 2. Interactive feature variables based on turnover and outside air average temperature | 2. Interactive feature variables based on output of product A and output of product B | 2. Electricity consumption of previous period |
| 3. Outside air average temperature | 3. Interactive feature variables based on electricity consumption of previous period and output of product B | 3. Interactive feature variables based on output of product A and outside temperature indicative adjustment |
| 4. Interactive feature variables based on outside air average temperature and number of production lines of product A | 4. Interactive feature variables based on number of people in factory and electricity consumption of previous period | 4. Interactive feature variables based on outside temperature indicative adjustment and electricity consumption of previous period |
| 5. Number of production lines of product B | 5. Interactive feature variables based on output of product B and number of people in factory | |
| 6. Interactive feature variables based on turnover and electricity consumption of previous period | 6. Interactive feature variables based on output of product B and number of people in factory | |
| 7. Interactive feature variables based on number of people in factory and outside air average temperature | | |

It should be mentioned that in some embodiments, the processor 130 may perform feature selection for each electricity consumption type, and these electricity consumption types also correspond to different combinations of important feature variables.

Next, in step S413, the processor 130 trains a plurality of prediction models by using the groups of important feature variables and a historical actual electricity consumption amount in the historical period based on a plurality of model types. These model types may include conventional statistical models such as the linear regression model or the least absolute shrinkage and selection operator (LASSO) model. Alternatively, these model types may include machine learning models, such as the support vector machine (SVM) model or the random forest model. Still alternatively, these model types may include deep learning models, such as the recurrent neural network (RNN) model or the long short-term memory (LSTM) model. Still alternatively, these model types may include integrated models, such as the stacking model or the weighted sum model. However, the model types are not limited in the disclosure, which may be set according to actual applications.

Therefore, each of the prediction models is trained based on one group among the groups of important feature variamount in the historical period. Besides, the processor 130 may train the third prediction model based on the second group of important feature variables, the first model type, and the historical actual electricity consumption amount in the historical period. Further, the processor 130 may train the fourth prediction model based on the second group of important feature variables, the second model type, and the historical actual electricity consumption amount in the historical period. In other words, the processor 130 uses the same group of important feature variables and different model types to establish a plurality of prediction models corresponding to different model types. The processor 130 uses the plurality of groups of important feature variables and a specific model type to establish the plurality of prediction models corresponding to different groups of important feature variables.

In step S414, the processor 130 tests the plurality of prediction models by using model testing data. The processor 130 first acquires the model testing data in another historical period of the electricity consumption type and then tests the plurality of prediction models corresponding to the plurality of model types. The model testing data may include a plurality of historical actual electricity consumption amounts in another historical period and a plurality of feature variables that may affect the electricity consumption in another historical period. In the model testing stage, the processor 130 may acquire a plurality of groups of important feature variables used for testing these prediction models in another historical period according to the model testing data. The processor 130 inputs the groups of important feature variables into the corresponding prediction models to obtain output data of these prediction models and to acquire the error between the output data of the prediction models and the corresponding historical actual electricity consumption amount to evaluate the pros and cons of these prediction models.

In step S415, the processor 130 selects the electricity consumption prediction model from among the prediction models according to a model measuring index. In some embodiments, in the model testing stage, the processor 130 may acquire a corresponding model evaluation index by testing these prediction models using the model testing data. The model evaluation index is, for example, the mean absolute error (MAE) or the mean absolute percentage error (MAPE), but the disclosure is not limited thereto. In some embodiments, the processor 130 may compare the model evaluation indexes of the prediction models and selects the prediction model with the smallest model evaluation index as the final electricity consumption prediction model.

For instance, assuming that the processor 130 generates 9 prediction models based on three feature selection algorithms and three model types, the processor 130 may acquire the model evaluation index of each prediction model after testing the 9 prediction models. Table 2 lists examples of the model evaluation indexes for nine prediction models.

TABLE 2

| Feature Selection Algorithm | Model Type | Model Evaluation Index (MAPE) |
| --- | --- | --- |
| Stepwise | linear regression model | 0.031 |
| Stepwise | random forest model | 0.013 |
| Stepwise | stacking model | 0.093 |
| Shrinkage | linear regression model | 0.044 |
| Shrinkage | random forest model | 0.054 |
| Shrinkage | stacking model | 0.096 |
| Permutation Importance | linear regression model | 0.078 |
| Permutation Importance | random forest model | 0.043 |
| Permutation Importance | stacking model | 0.001 |

Based on the examples in Table 2, by searching for the smallest model evaluation index MAPE, the processor 130 may select the prediction model corresponding to the permutation importance model and the stacking model from among the 9 prediction models as the electricity consumption prediction model. In other words, in this example, the input data of the electricity consumption prediction model is the important feature variable which is determined based on permutation importance. Therefore, the important feature variables do not need to be manually selected, and time and labor costs may thus be saved. With reference to FIG. 4 again, in step S420, the processor 130 predicts the reference electricity consumption amount in the unit period based on the factory actual operation information in the unit period by using an electricity consumption prediction model. It can be seen that, based on the important feature variables determined during the model establishment period, the processor 130 may obtain a plurality of important feature variables from the factory actual operation information in the unit period and may input the important feature variables corresponding to the unit period into the electricity consumption prediction model to predict the reference electricity consumption amount of an electricity consumption type in the unit period. In step S430, the processor 130 acquires an actual electricity consumption amount in the unit period. In step S440, the processor 130 displays the reference electricity consumption amount and the actual electricity consumption amount on the electricity consumption reference interface. In step S450, the processor 130 provides a function according to the first difference value between the reference electricity consumption amount and the actual electricity consumption amount. The detailed implementation of steps S420 to S450 is clearly described in steps S210 to S240 in the embodiment of FIG. 2, and description thereof is not to be repeated herein.

In some embodiments, the processor 130 may predict the factory predicted operation information in a future unit period. In some embodiments, the processor 130 may predict the factory predicted operation information in the future unit period. For instance, the processor 130 may predict the factory predicted operation information in the future unit period according to the factory production plan, the number of people in the factory, the average temperature, or the turnover information. In some embodiments, the factory predicted operation information may be provided by the person in charge of the factory via the input device of the electronic apparatus 100.

In some embodiments, the processor 130 may determine a predicted electricity consumption amount in the future unit period by using an electricity consumption prediction model based on the factory predicted operation information in the future unit period. To be specific, in step S460, the processor 130 predicts a predicted reference electricity consumption amount in the future unit period based on the factory predicted operation information in the future unit period by using the electricity consumption prediction model. To be specific, the processor 130 inputs the important feature variables in the future unit period into the electricity consumption prediction model, so that the electricity consumption prediction model may generate a predicted reference electricity consumption amount.

It should be noted that since the factory will continue to implement an energy-saving item or the electricity-consuming item in the future unit period, the processor 130 may also determine the predicted electricity consumption amount in the future unit period according to the predicted reference electricity consumption amount as well as the electricity saving that may be caused by the electricity-saving item or the electricity consuming that may be raised by the electricity-consuming item. In step S470, the processor 130 determines a difference adjustment rate according to the first difference value between the reference electricity consumption amount and the actual electricity consumption amount in a specific unit period. In step S480, the processor determines the predicted electricity consumption amount according to the predicted reference electricity consumption amount and the difference adjustment rate. The difference adjustment rate is determined according to the first difference value between the reference electricity consumption amount and the actual electricity consumption amount in a specific unit period, and the difference adjustment rate is between 0% and 100%. For instance, the processor 130 may acquire the first difference value between the reference electricity consumption amount in October and the actual electricity consumption amount in October based on steps S420 to S430, and the first difference value is related to the electricity saving caused by a specific electricity-saving item. Therefore, the processor 130 may calculate the difference adjustment rate according to the first difference value.

For instance, it is assumed that the reference electricity consumption amount in October is X kWh, and the actual electricity consumption amount is Y kWh. The processor 130 can obtain the first difference value as (X−Y) kWh, and the difference adjustment rate is [1−(X−Y)/X]*100%. The processor 130 may multiply the predicted reference electricity consumption amount in November by the difference adjustment rate to acquire the predicted electricity consumption amount in November.

In addition, in some embodiments, the processor 130 may also calculate the difference adjustment rate according to a plurality of first difference values between a plurality of reference electricity consumption amounts and the corresponding actual electricity consumption amounts in a plurality of unit periods. In some embodiments, the processor 130 may calculate different first difference adjustment rates corresponding to a plurality of unit time periods according to a plurality of first difference values corresponding to the plurality of unit time periods. After that, the processor 130 averages the first difference adjustment rates to acquire a second difference adjustment rate for determining the predicted electricity consumption amount.

In some embodiments, after acquiring a plurality of first difference values between a plurality of reference electricity consumption amounts and a plurality of corresponding actual electricity consumption amounts in a plurality of unit periods, the processor 130 may calculate the average value of these first difference values first. Next, the processor 130 may subtract the average value of the first difference values from the predicted reference electricity consumption amount to obtain the predicted electricity consumption amount for a future unit period. For instance, the processor 130 may acquire 5 first difference values from June to October, and the processor 130 calculates the average value of these 5 first difference values. Assuming that the average value of the 5 first difference values is Z kWh, the processor 130 may then subtract Z kWh from the predicted reference electricity consumption amount in November to acquire the predicted electricity consumption amount in November.

In some embodiments, the processor 130 may display the predicted electricity consumption amount of at least one future unit period on an electricity consumption prediction interface through the display 110. In some embodiments, the processor 130 may generate an overall electricity consumption report of the factory or may determine an electricity purchase amount of the factory according to the actual electricity consumption amounts in a plurality of unit periods and the predicted electricity consumption amounts in a plurality of future unit periods.

Figure 6:
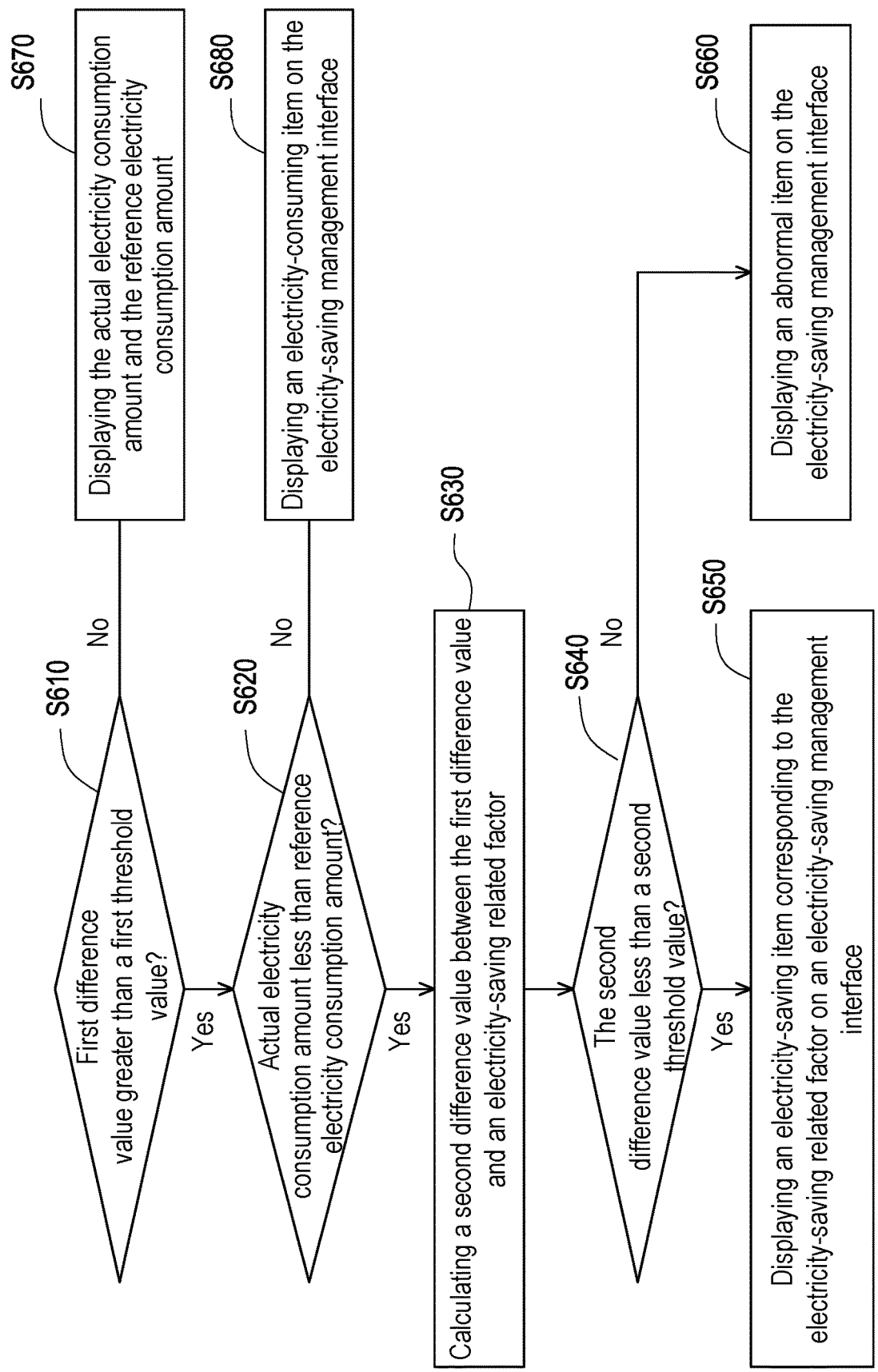
FIG. 6 is a flow chart of providing a function based on a first difference value according to an embodiment of the disclosure.

In some embodiments, in order to detect the effect of the energy-saving item or determine whether there is an abnormal electricity-consuming item according to the first difference value between the reference electricity consumption amount in the unit period and the actual electricity consumption amount, the processor 130 determines the first difference value and provides a function according to the first difference value. With reference to FIG. 6, which is a flow chart of an energy-saving prediction method for factory electricity consumption according to an embodiment of the disclosure. The method provided by this embodiment is suitable for the electronic apparatus 100 in the foregoing embodiments, and description of the detailed steps of providing a function according to the first difference value in this embodiment as well as the various devices in the electronic apparatus 100 is provided as follows.

In step S610, the processor 130 determines whether the first difference value is greater than or equal to a first threshold value. In the example shown in FIG. 6, the first difference value is an absolute difference value. If the first difference value is not greater than or equal to the first threshold value (No is determined in step S610), in step S670, the processor 130 displays the reference electricity consumption amount and the actual electricity consumption amount. If the first difference value is greater than or equal to the first threshold value (Yes is determined in step S610), in step S620, the processor 130 determines whether the actual electricity consumption amount is less than the reference electricity consumption amount. If the actual electricity consumption amount is not less than the reference electricity consumption amount (No is determined in step S620), in step S680, in response to the actual electricity consumption amount being greater than the reference electricity consumption amount and the first difference value being greater than and equal to the first threshold value, the processor 130 displays the electricity-consuming item on the electricity-saving management interface. To be specific, if the actual electricity consumption amount is greater than the reference electricity consumption amount and the first difference value is greater than the first threshold value, it means that there must be an electricity-consuming item in the factory, so even if the factory implements the energy-saving item, the actual electricity consumption amount is still significantly greater than the reference electricity consumption amount.

In contrast, if the actual electricity consumption amount is less than the reference electricity consumption amount (Yes is determined in step S620), in step S630, in response to the actual electricity consumption amount being less than the reference electricity consumption amount and the first difference value being greater than and equal to the first threshold value, the processor 130 calculates a second difference value between the first difference value and an electricity-saving related factor. The second difference value may be an absolute difference value. To be specific, if the actual electricity consumption amount is less than the reference electricity consumption amount and the first difference value is greater than or equal to the first threshold value, it means that the at least one electricity-saving item implemented by the factory has achieved a certain electricity-saving effect. In some embodiments, the electricity-saving related factor is the total electricity-saving amount of the at least one electricity-saving item. In some embodiments, the processor 130 may further determine whether the second difference value between the electricity-saving amount caused by a specific electricity-saving item and the first difference value is sufficiently small. Alternatively, in some embodiments, the processor 130 may further determine whether the second difference value between the sum of a plurality of electricity-saving amounts of a plurality of electricity-saving items and the first difference value is sufficiently small.

For instance, the electricity amount actually saved by the energy-saving item "ice water host intelligent switch adjustment" in January is M kWh, and the electricity amount actually saved by the energy-saving item "ice water host intelligent switch adjustment" in February is N kWh. The electricity amount actually saved by the energy-saving item "central air conditioning group control system adjustment" in February is P kWh." The processor 130 may set the electricity-saving related factor in January related to the electricity consumption of air conditioning to M kWh and may set the electricity-saving related factor in February related to the electricity consumption of air conditioning to be (N+P) kWh.

Therefore, in step S640, the processor 130 determines whether the second difference value is greater than a second threshold value. If the second difference value is less than the second threshold value (Yes is determined in step S640), in step S650, in response to the second difference value being less than the second threshold value, the processor 130 displays an electricity-saving item corresponding to the electricity-saving related factor on an electricity-saving management interface. To be specific, if the second difference value is less than the second threshold value, it means that the electricity-saving amount of the at least the electricity-saving item is as expected. Therefore, the processor 130 may display an electricity-saving item corresponding to the electricity-saving related factor through the electricity-saving management interface, so that the person in charge of the factory may understand the corresponding electricity-saving amount of each electricity-saving item.

Besides, if the second difference value is not less than the second threshold value (No is determined in step S640), in step S660, in response to the second difference value not being less than the second threshold value, the processor 130 displays an abnormal item on the electricity-saving management interface. Herein, the abnormal item may include an abnormal electricity-consuming item, an electricity-saving related abnormal item, or other abnormal items.

To be specific, if the second difference value is not less than the second threshold value, in one case, it means that there may be an abnormal electricity-consuming item in the factory, so even if the factory implements the energy-saving item, there is a gap between a first gap value and the electricity-saving related factor. Therefore, the processor 130 may display the possible abnormal electricity-consuming items through an electricity-saving management interface for the person in charge of the factory to check. In some embodiments, the processor 130 may further search for production information of other products (e.g., the trial production record of a new product) to search for electricity-consuming item that occurs during trial production of the new product. For instance, regarding the production electricity consumption, the factory conducts trial production of the new product A and trial production of the new product B in January, and the processor 130 may search for the additional electricity consumption amount caused by the trial production of these new products in response to determining the existence of the electricity-consuming item. Further, if the second difference value is not less than the second threshold value, in another case, it means that there is an error in the estimation of the electricity-saving related factor, or the electricity-saving efficiency of the electricity-saving item exceeds expectations, so that there is a gap between the first gap value and the electricity-saving related factor. Therefore, the processor 130 may display the possible abnormal items through an electricity-saving management interface for the person in charge of the factory to check. For instance, the processor 130 may display the electricity-saving related abnormal item and the corresponding electricity-saving related factor on the electricity-saving management interface for the person in charge of the factory to confirm.

For instance, FIG. 7A is a schematic view of an electricity consumption reference interface according to an embodiment of the disclosure. FIG. 7B is a schematic view of an electricity-saving management interface according to an embodiment of the disclosure. With reference to FIG. 7B and FIG. 7A, after acquiring the actual electricity consumption amount and the reference electricity consumption amount of each electricity consumption type in different unit periods, the processor 130 may display line graphs 311, 312, 313, and 314 on the electricity consumption reference interface 31. Each of the line graphs 311, 312, 313, and 314 includes an actual electricity consumption line and a predicted reference line. Taking the line graph 311 of the basic electricity consumption as an example, the processor 130 may acquire a first difference value D1 according to an actual electricity consumption amount R3 and a reference electricity consumption amount R4 in March. As shown in FIG. 7A, it is assumed that the second difference value between the first difference value D1 and the electricity-saving related factor is less than the second threshold value. Therefore, with reference to FIG. 7B, the processor 130 may display an energy-saving item 711 of the basic electricity consumption and the electricity-saving amount corresponding to the energy-saving item 711 on an electricity-saving management interface 71. On the other hand, taking the line graph 313 of the air-compression electricity consumption as an example, the processor 130 may acquire a second difference value D2 according to an actual electricity consumption amount R6 and a reference electricity consumption amount R5 in April. As shown in FIG. 7A, the actual electricity consumption amount R6 is greater than the reference electricity consumption amount R5. Therefore, with reference to FIG. 7B, the processor 130 may display an abnormal electricity-consuming item 712 of the air-compression electricity consumption and the electricity-consuming amount corresponding to the abnormal electricity-consuming item 712 on the electricity-saving management interface 71.

In view of the foregoing, in the embodiments of the disclosure, the reference electricity consumption amount of a specific electricity consumption type in the factory may be predicted by the trained electricity consumption prediction model, and the reference electricity consumption amount is a prediction value based on past electricity consumption patterns. Therefore, the reference electricity consumption amount and the actual electricity consumption amount may be displayed on the electricity consumption reference interface for the person in charge of the factory to view, so that the person in charge of the factory may evaluate the electricity consumption status for different time periods. The difference value between the reference electricity consumption amount and the actual electricity consumption amount may also allow the person in charge of the factory to understand the effect of energy-saving item or whether abnormal electricity consumption occurs in a timely manner. Besides, in the embodiments of the disclosure, different electricity consumption prediction models may be established for various electricity consumption types, so as to help the person in charge of the factory to easily find out the part with abnormal electricity consumption and take improvement measures.

Further, in the embodiments of the disclosure, the trained electricity consumption prediction model may also be used to determine the predicted electricity consumption amount in the future unit period. The predicted electricity consumption amount determined based on the electricity consumption prediction model and the difference adjustment rate may be closer to the real situation, such that the person in charge of the factory may accordingly estimate the electricity consumption costs and measure the overall electricity consumption and the amount of green energy to be purchased in the future.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An energy-saving prediction method for factory electricity consumption, adapted to an electronic apparatus, comprising:
performing following through the electronic apparatus:
predicting, by using an electricity consumption prediction model, a reference electricity consumption amount in a unit period based on factory actual operation information in the unit period;
acquiring an actual electricity consumption amount in the unit period;
displaying the reference electricity consumption amount and the actual electricity consumption amount on an electricity consumption reference interface; and
providing a function according to a first difference value between the reference electricity consumption amount and the actual electricity consumption amount,
wherein the step of providing the function according to the first difference value between the reference electricity consumption amount and the actual electricity consumption amount comprises:
calculating a second difference value between the first difference value and an electricity-saving related factor in response to the actual electricity consumption amount being less than the reference electricity consumption amount and the first difference value being greater than and equal to a first threshold value; and
displaying an electricity-saving item corresponding to the electricity-saving related factor on an electricity-saving management interface in response to the second difference value being less than a second threshold value.

2. The energy-saving prediction method for factory electricity consumption according to claim 1, wherein the step of displaying the reference electricity consumption amount and the actual electricity consumption amount on the electricity consumption reference interface comprises:
displaying the reference electricity consumption amount and the actual electricity consumption amount on the electricity consumption reference interface through a graph,
wherein the graph comprises a line graph, the line graph comprises a predicted reference line and an actual electricity consumption line, the predicted reference line comprises the reference electricity consumption amount, and the actual electricity consumption line comprises the actual electricity consumption amount.

3. The energy-saving prediction method for factory electricity consumption according to claim 1, wherein before the step of predicting, by using the electricity consumption prediction model, the reference electricity consumption amount in the unit period based on the factory actual operation information in the unit period, the method further comprises:
acquiring a plurality of feature variables of an electricity consumption type in a historical period;
selecting a plurality of groups of important feature variables from among the feature values;
training, by using the groups of important feature variables and a historical actual electricity consumption amount in the historical period, a plurality of prediction models based on a plurality of model types, wherein each of the prediction models is trained based on one group among the groups of important feature variables and one of the model types; and
selecting the electricity consumption prediction model of the electricity consumption type from among the prediction models according to a model evaluation index.

4. The energy-saving prediction method for factory electricity consumption according to claim 3, further comprising:
generating a plurality of interactive feature variables according to any two of the feature variables,
wherein the step of selecting the plurality of groups of important feature variables from among the feature values comprises:
determining the plurality of groups of important feature variables from the feature variables and the interactive feature variables based on a plurality of feature selection algorithms, wherein each of the plurality of groups of important feature variables comprise a plurality of important feature variables.

5. The energy-saving prediction method for factory electricity consumption according to claim 1, wherein the step of providing the function according to the first difference value between the reference electricity consumption amount and the actual electricity consumption amount further comprises:
displaying an abnormal item on the electricity-saving management interface in response to the second difference value not being less than a second threshold value.

6. The energy-saving prediction method for factory electricity consumption according to claim 1, wherein the step of providing the function according to the first difference value between the reference electricity consumption amount and the actual electricity consumption amount further comprises:
displaying an electricity-consuming item on the electricity-saving management interface in response to the actual electricity consumption amount being greater than the reference electricity consumption amount and the first difference value being greater than and equal to the first threshold value.

7. The energy-saving prediction method for factory electricity consumption according to claim 1, wherein the step of providing the function according to the first difference value between the reference electricity consumption amount and the actual electricity consumption amount further comprises:
highlighting the reference electricity consumption amount and the actual electricity consumption amount in the unit period in the electricity consumption reference interface in response to the first difference value corresponding to the unit period satisfying a specific condition.

8. The energy-saving prediction method for factory electricity consumption according to claim 1, further comprising:
determining, by using the electricity consumption prediction model, a predicted electricity consumption amount in a future unit period based on factory predicted operation information in the future unit period.

9. The energy-saving prediction method for factory electricity consumption according to claim 8, wherein the step of determining, by using the electricity consumption prediction model, the predicted electricity consumption amount in the future unit period based on the factory predicted operation information in the future unit period comprises:
predicting, by using the electricity consumption prediction model, a predicted reference electricity consumption amount of an electricity consumption type in the future unit period based on the factory predicted operation information in the future unit period; and determining the predicted electricity consumption amount according to the predicted reference electricity consumption amount and a difference adjustment rate, wherein the difference adjustment rate is determined according to the first difference value between the reference electricity consumption amount and the actual electricity consumption amount.

10. An electronic apparatus, comprising:

a display;

a storage circuit, storing a plurality of instructions; and a processor, coupled to the display and the storage circuit, accessing the instructions for:

predicting, by using an electricity consumption prediction model, a reference electricity consumption amount in a unit period based on factory actual operation information in the unit period;

acquiring an actual electricity consumption amount in the unit period;

displaying the reference electricity consumption amount and the actual electricity consumption amount on an electricity consumption reference interface; and providing a function according to a first difference value between the reference electricity consumption amount and the actual electricity consumption amount, wherein the processor further:

calculates a second difference value between the first difference value and an electricity-saving related factor in response to the actual electricity consumption amount being less than the reference electricity consumption amount and the first difference value being greater than and equal to a first threshold value; and displays an electricity-saving item corresponding to the electricity-saving related factor on an electricity-saving management interface in response to the second difference value being less than a second threshold value.

11. The electronic apparatus according to claim 10, wherein the processor further:

displays the reference electricity consumption amount and the actual electricity consumption amount on the electricity consumption reference interface through a graph, wherein the graph comprises a line graph, the line graph comprises a predicted reference line and an actual electricity consumption line, the predicted reference line comprises the reference electricity consumption amount, and the actual electricity consumption line comprises the actual electricity consumption amount.

12. The electronic apparatus according to claim 10, wherein the processor further:

acquires a plurality of feature variables of an electricity consumption type in a historical period;

selects a plurality of groups of important feature variables from among the feature values;

trains, by using the groups of important feature variables and a historical actual electricity consumption amount in the historical period, a plurality of prediction models based on a plurality of model types, wherein each of the prediction models is trained based on one group among the groups of important feature variables and one of the model types; and selects the electricity consumption prediction model of the electricity consumption type from among the prediction models according to a model evaluation index.

13. The electronic apparatus according to claim 12, wherein the processor further:

generates a plurality of interactive feature variables according to any two of the feature variables; and determines the plurality of groups of important feature variables from the feature variables and the interactive feature variables based on a plurality of feature selection algorithms, wherein each of the plurality of groups of important feature variables comprise a plurality of important feature variables.

14. The electronic apparatus according to claim 10, wherein the processor further:

displays an abnormal item on the electricity-saving management interface in response to the second difference value not being less than a second threshold value.

15. The electronic apparatus according to claim 10, wherein the processor further:

displays an electricity-consuming item on the electricity-saving management interface in response to the actual electricity consumption amount being greater than the reference electricity consumption amount and the first difference value being greater than and equal to the first threshold value.

16. The electronic apparatus according to claim 10, wherein the processor further:

highlights the reference electricity consumption amount and the actual electricity consumption amount in the unit period in the electricity consumption reference interface in response to the first difference value corresponding to the unit period satisfying a specific condition.

17. The electronic apparatus according to claim 10, wherein the processor further:

determines, by using the electricity consumption prediction model, a predicted electricity consumption amount in a future unit period based on factory predicted operation information in the future unit period; and displays the predicted electricity consumption amount on an electricity consumption prediction interface.

18. The electronic apparatus according to claim 17, wherein the processor further:

predicts, by using the electricity consumption prediction model, a predicted reference electricity consumption amount in the future unit period based on the factory predicted operation information in the future unit period; and determines the predicted electricity consumption amount according to the predicted reference electricity consumption amount and a difference adjustment rate, wherein the difference adjustment rate is determined according to the first difference value between the reference electricity consumption amount and the actual electricity consumption amount.

* * * * *